US006459354B2

(12) United States Patent
Konda et al.

(10) Patent No.: US 6,459,354 B2
(45) Date of Patent: Oct. 1, 2002

(54) BREAKER APPARATUS

(75) Inventors: Kazumoto Konda, Nagoya (JP); Junji Muta, Yokkaichi (JP); Tatsuya Sumida, Yokkaichi (JP); Yoshito Oka, Yokkaichi (JP); Ichiaki Sano, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 36 days.

(21) Appl. No.: 09/739,015

(22) Filed: Dec. 19, 2000

(65) Prior Publication Data

US 2001/0002118 A1 May 31, 2001

(30) Foreign Application Priority Data

Aug. 18, 1999 (JP) .......................................... 11-231907
Dec. 20, 1999 (JP) .......................................... 11-361523

(51) Int. Cl.[7] ............................ H02B 1/18; H01H 1/00; H01H 85/20

(52) U.S. Cl. .................. 337/9; 337/4; 337/5; 337/194; 200/238; 200/17 R; 200/243

(58) Field of Search ............................... 337/4, 1, 5, 9, 337/142, 186, 194, 208; 307/112, 116, 125, 130, 131, 149; 315/88, 93, 129, 130, 136; 340/635, 638, 652; 200/17 R, 43.05, 238, 43.01–43.22, 50.01–50.11, 243

(56) References Cited

U.S. PATENT DOCUMENTS 1,966,716 A * 7/1934 Green et al. ................ 337/188
2,072,729 A 3/1937 Corbett
2,186,813 A * 1/1940 Adam et al. ................ 337/194
3,030,474 A * 4/1962 Scott et al. ................. 337/146
3,358,100 A * 12/1967 Schleicher et al. ......... 337/194
3,379,842 A * 4/1968 Downs et al. .............. 337/146
4,283,100 A * 8/1981 Griffin et al. ............... 361/823
4,733,028 A 3/1988 Flumignan
5,399,103 A 3/1995 Kuboshima et al.
5,906,508 A * 5/1999 Jeffcoat ...................... 200/308
5,993,225 A * 11/1999 Johnson et al. ............ 439/136
6,337,448 B1 * 1/2002 Konda ........................ 200/238

FOREIGN PATENT DOCUMENTS

| | | | |
|---|---|---|---|
| DE | 19519857 A1 * | 12/1996 | .......... H01H/85/20 |
| DE | 100 21 722 A 1 | 1/2001 | |
| EP | 0 790 677 A2 | 8/1997 | |
| EP | 1 077 456 A2 | 2/2001 | |
| FR | 2 445 009 | 7/1980 | |
| JP | A-9-223439 | 8/1997 | |
| JP | A-11-252703 | 9/1999 | |

* cited by examiner

*Primary Examiner*—Anatoly Vortman
(74) *Attorney, Agent, or Firm*—Oliff & Berridge, PLC

(57) ABSTRACT

The breaker apparatus is disclosed which comprises a projecting wall standing upright from the base of a breaker body; a pair of plate-shaped fixed electrodes laid on the front and back surfaces of the projecting wall; a recessed plug to be fitted on the projecting wall; a U-shaped movable electrode to be stored in the plug for bringing the both fixed electrodes into conduction by clamping the projecting wall on the front and back surfaces thereof; a fuse storage section for storing a fuse connected to one of the fixed electrodes in the surrounding wall standing upright from the base in parallel with the projecting wall; a cover for covering the opening of the fuse storage section and being fittable to the surrounding wall; an engaging surface formed on the plug and facing in the fitting direction of the plug; and a cover motion stopper provided on the cover for engaging with the engaging surface of the plug with the plug fitted to the projecting wall.

5 Claims, 14 Drawing Sheets

BREAKER APPARATUS

BACKGROUND OF THE INVENTION

The present invention relates to a breaker apparatus to be used for switching the power cable connected to the battery or the like of the automotive vehicle between the conduction state and the out-of-conduction state.

In the Japanese Patent Application No. Hei10-47920 filed by the present applicant, as shown in FIG. 13, there is shown a breaker apparatus 1 and fuse 4 being provided separately in the midsection of the power cable of the electric vehicle.

On the other hand, in the Unexamined Japanese Patent Application Publication No. Hei9-223439, as shown in FIG. 14, a breaker apparatus 3 provided with a fuse 4 accommodated therein. The breaker -apparatus 3 accommodates a fuse 4 within the case body 5A, and is provided with two cylindrical fixed electrodes 2, 2 projecting upwardly from the bottom of the case 5A. The cover 5B for closing the upper opening of the case body 5A is formed with a pair of through holes 6, 6 corresponding to the fixed electrodes 2, 2. When cylindrical leg portions 8, 8 provided on the movable electrode 7 are inserted into these holes 6, 6, the fixed-electrodes 2, 2 and legs 8, 8 are fitted, so that the fixed electrodes 2, 2 are brought into conduction, whereby the cable e is switched from the out-of-conduction state into the conduction state.

Both breaker apparatuses 1, 3 described above have both an advantage and a disadvantage. In other word, the breaker apparatus 1 (See FIG. 13) has an advantage in that since it is separate from the fuse 4, it can be downsized in comparison with the apparatus having a fuse integrated therein, while it has a disadvantage in that close attention must be paid to verification whether the breaker apparatus 1 is in OFF-state when the operator have to touch the fuse, for example, for replacing the fuse, because the fuse 4 may be exposed with the breaker apparatus 1 in ON-state.

On the other hand, the latter case (See FIG. 14) has an advantage in that verification described above is not necessary because replacement of the fuse cannot be performed without disangaging the movable electrode to turn the breaker apparatus 3 OFF, thus the breaker apparatus is always in OFF state when replacing the fuse. However, the breaker apparatus 3 has a structure having two fixed electrodes 2, 2 separately in upright position, it is difficult to satisfy the requirement of downsizing. In addition, operation is not easy because the movable electrodes have to be passed through the cover 5B at two positions in order to connect the movable electrode 7 and the fixed electrode 2.

With such a circumstances in view, it is an object of the present invention to provide a breaker apparatus being able to be downsized, being brought out of conduction without fail when replacing the fuse, and being easy to operate.

SUMMARY OF THE INVENTION

First Aspect of the Invention

A breaker apparatus according to the first aspect of the invention comprises a projecting wall standing upright from the base of the breaker body, a pair of plate-shaped fixed electrodes laid on the front and back surfaces of the projecting wall, a recessed plug to be fitted on the projecting wall, a U-shaped movable electrode to be stored in the plug for bringing the both fixed electrodes into conduction by clamping the projecting wall on its front and back surfaces, a fuse storage section for storing the fuse connected to one of fixed electrodes, a cover for covering the opening of the fuse storage section and being fittable to the surrounding wall, an engaging surface formed on the plug and facing in the fitting direction of the plug, and a cover motion stopper provided on the cover for engaging with the engaging surface of the plug with the plug fitted to the projecting wall.

In the structure according to the first aspect of the invention, since a pair of fixed electrodes are located at one point by laying them on the front and back surfaces of the projecting wall, the space around both fixed electrodes can be shared and thus the breaker apparatus can be downsized. When the plug is fitted to the projecting wall, the projecting wall is interposed between the movable electrodes stored in the plug so that both fixed electrodes are brought into conduction. At this time, since just a single plug is required to be mounted, mounting operation can be carried out easier than the case of conventional one that requires two plugs. When the plug is fitted onto the projecting wall, the cover motion stopper provided on the cover for covering the fuse storage section engages with the engaging surface provided on the plug. Therefore, the cover cannot be removed unless the plug is pulled out, in other word, it is ensured that the plug is removed and brought out of conduction when replacing the fuse.

Second Aspect of the Invention

The invention according to the second aspect is a breaker apparatus as set forth in the first aspect, wherein the engaging surface is disposed on the plug on the side of the tip in the fitting direction, and the cover motion stopper is disposed on the lower end of the vertical wall suspending from the top portion of the cover along the side surface of the plug and formed in the shaped of a projecting strip overhanging from the lower end of the vertical wall so as to lie along the engaging surface of the plug.

According to the second aspect of the invention, since the cover motion stopper engages with the engaging surface provided on the distal end of the plug in the fitting direction, the cover motion stopper is still engaging with the engaging surface of the plug in the state in which the plug is on the way to be removed, and thus the cover cannot be separated from the fuse storage section. In other wards, unless the plug is completely removed from the projecting wall to bring out of conduction completely, the cover cannot be removed from the fuse storage section, thereby ensuring that replacement of the fuse in the state of conduction is prevented.

Third aspect of the Invention

The third aspect of the present invention is a breaker apparatus as set forth in Aspect 1 or Aspect 2, wherein the engaging surface is overhanging from the top surface of the lug toward the cover so as to engage with the cover motion stopper formed on the upper surface of the cover.

According to the third aspect of the invention, since the engaging surface overhanging from the top surface of the plug engages with the cover motion stopper formed on the upper surface of the cover so as to hold the cover motion stopper and the portion holding the cover is exposed to the outside, the state of engagement can be checked visually.

Fourth Aspect of the Invention

The fourth aspect of the invention is a breaker apparatus as set forth in any one of the first to third aspects, wherein a projection is formed on either one of the engaging surface or the cover motion stopper for engaging with a hole formed the other one of those.

According to the fourth aspect of the invention, since the projection and the hole engages with respect to each other, the cover motion stopper is prevented from being slipped off along the back surface of the engaging surface, whereby the engagement between them are enhanced.

Fifth Aspect of the Invention

The fifth aspect of the invention is a breaker apparatus as set forth in any one of Aspect 1 to Aspect 4, wherein a engaging portion for engaging with the surrounding wall of the breaker body to prevent the cover from being disengaged.

According to the fifth aspect of the invention, since the cover is engaged at both ends by engagement with the engaging surface of the plug and with surrounding wall of the breaker body by means of the engaging portion, disengagement of the cover 40 due to inclination thereof can be prevented.

DETAILED DESCRIPTION OF THE PREFERRED EMBODIMENTS

First Embodiment

Figure 1:
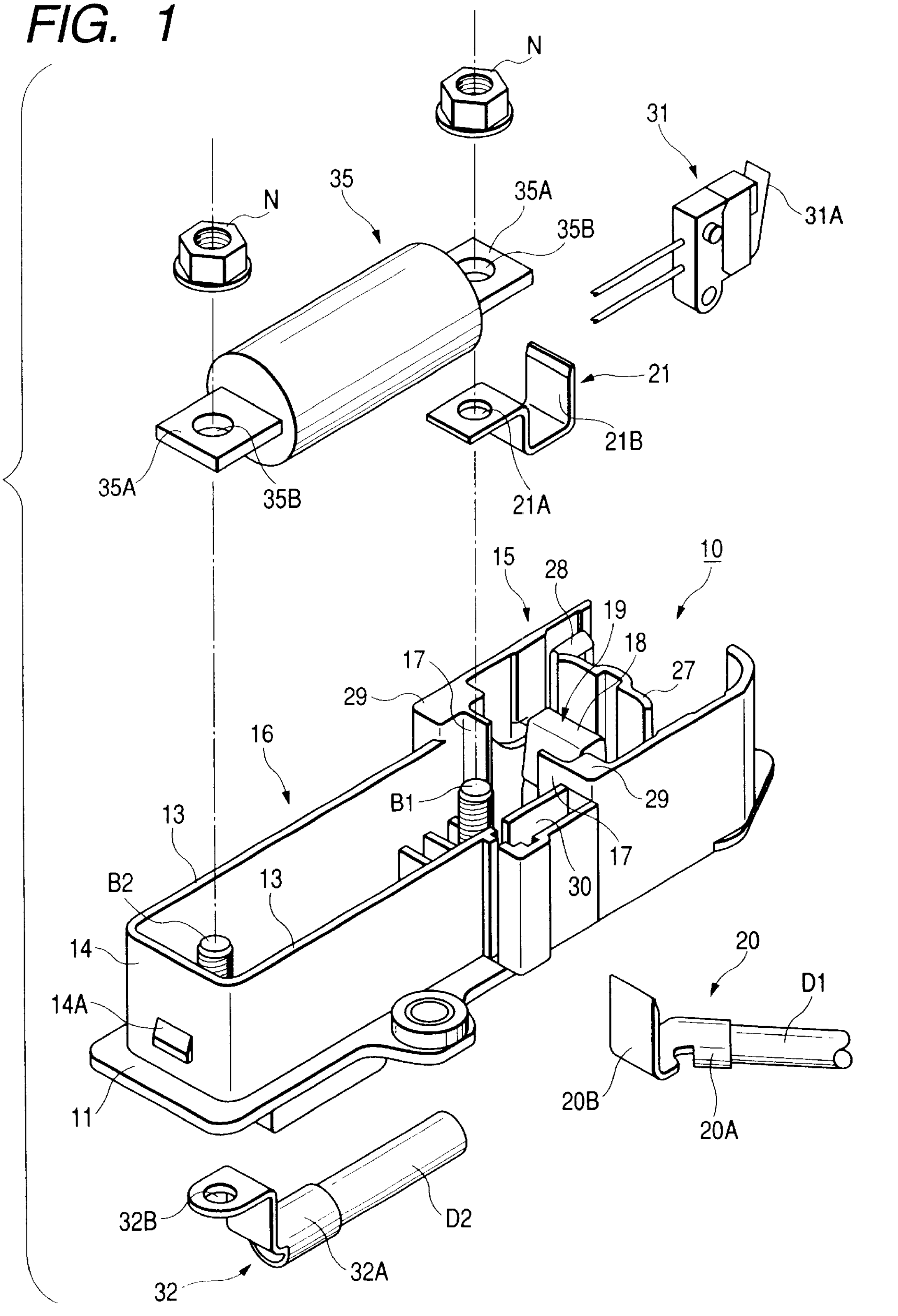
FIG. 1 is a perspective view of a breaker apparatus according to the first embodiment.

Referring now to FIG. 1 to FIG. 9, the first embodiment of the present invention will be described. The breaker apparatus of this embodiment is provided at some midpoint of the power cable of the electric vehicle for switching the power cable between the conduction state and the out-of-conduction state.

The breaker body 10 provided in this breaker apparatus is provided with a pair of elongated walls 13, 13 along the length of the plate-shaped base 11, and the ends of these elongated walls 13, 13 are connected by a short wall 14 on one side leaving the other ends open. The opened side is enlarged in a stepped manner so that a plug storage section 15 is formed therein, and the closed side is provided with a fuse storage section 16 enclosed by both elongated walls 13, 13 and the short wall 14. The plug storage section 15 and the fuse storage section 16 are divided by the partitioning walls 17, 17 extending from both elongated walls 13, 13 toward each other.

Figure 4:
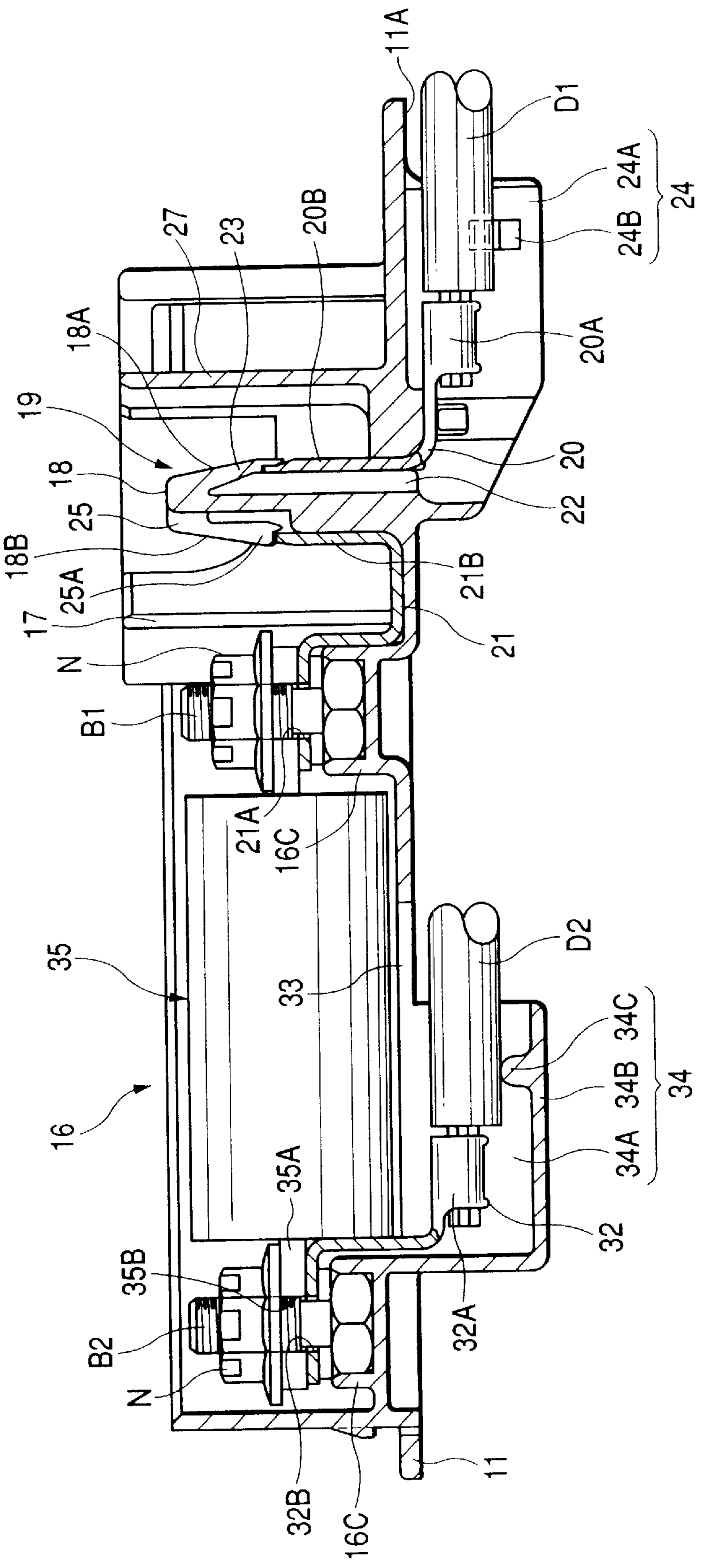
FIG. 4 is a cross sectional side view of the breaker body.

In the plug storage section 15 at the position away from the partitioning walls 17, as shown in FIG. 4, a projecting wall 18 is standing upright from the base 11, and the front and back surfaces facing in the direction along the length (toward left and right in FIG. 4) of the breaker body 10 are provided with a first and second fixed electrodes 20, 21.

Specifically, the front surface 18A of the projecting wall 18 facing toward the right in FIG. 4 is provided with a first fixed electrode 20, and the first fixed electrode 20 is formed by bending a metallic plate into L-shape so as to have a barrel portion 20A on its proximal end, to which a power cable D1 is crimped. The tip contact portion 20B of the first fixed electrode on the opposite end from the barrel portion 20A is inserted into the plug storage section 15 through a through hole 22 from the back side of the base 11 and laid on the proximal end of the front surface 18A of the projecting wall 18. On the tip side of the front surface 18A of the projecting wall 18, there is formed with a projecting portion 23 and the tip of the first fixed electrode 20 abuts against the lower surface of the projecting portion 23.

On the other hand, the back surface 18B of the projecting wall 18 facing toward the left in FIG. 4 is provided with the second fixed electrode 21, which is formed by bending a metallic plate into U-shape, and bending again one of the legs of the U-shape outwardly to form a right angle and providing a bolthole 21A on the tip thereon. The second fixed electrode 21 is pressed into between the partitioning wall 17 and the projecting wall 18 from the bottom side of the U-shape so that the tip contact portion, 21B is laid on the proximal end of the back surface 18B of the projecting wall 18. Through the bolthole 21A, a bolt B1 provided on the fuse storage section 16 described later is passed.

Figure 6:
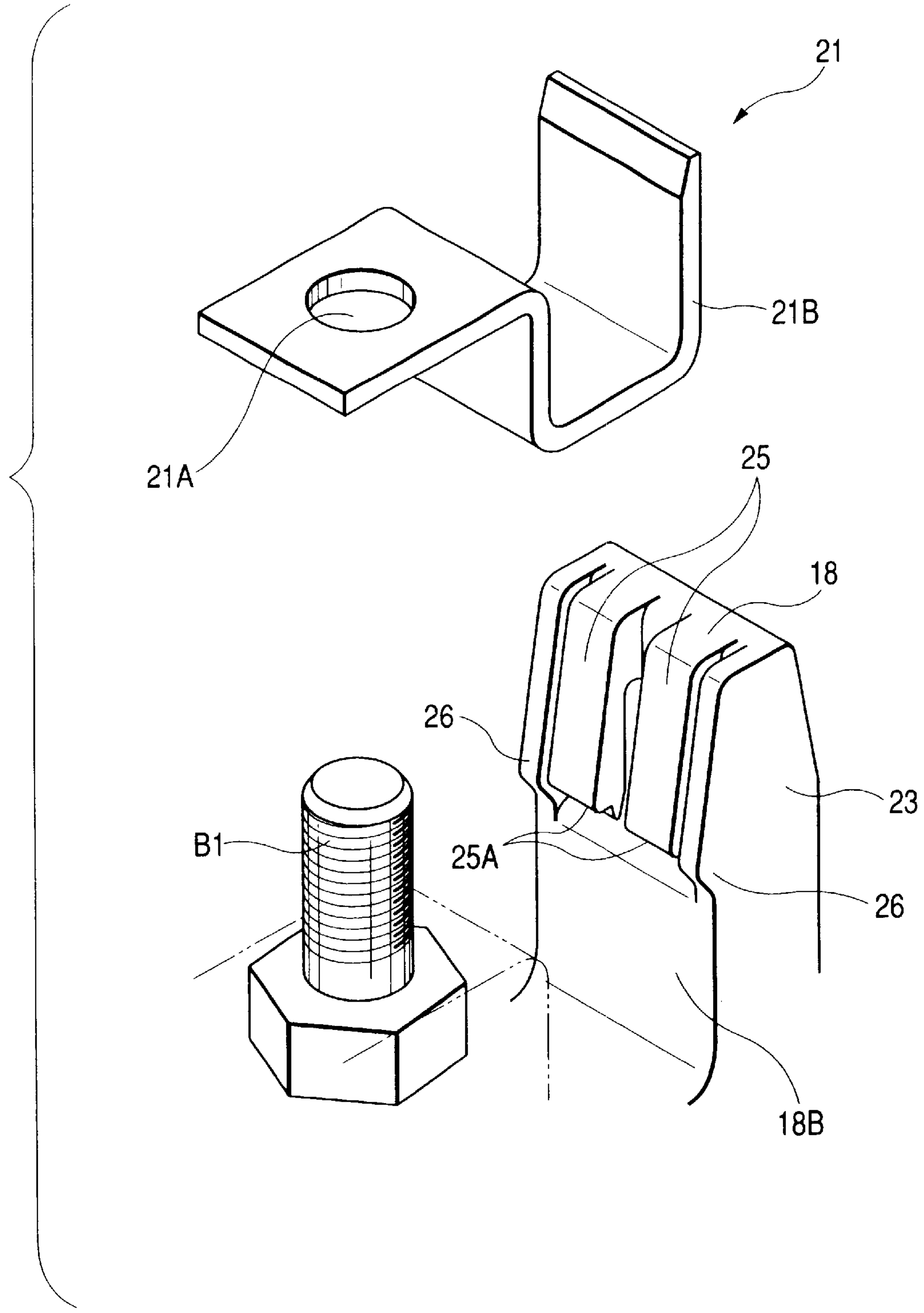
FIG. 6 is a perspective view showing the projecting wall and fixed electrodes.

On the tip of the back surface 18B of the projecting wall 18, as shown in FIG. 6, a pair of lances 25, 25 for preventing the second fixed electrode 21 from being disengaged. These lances 25, 25 extend from the tip of the projecting wall 18 horizontally and then downwardly in parallel with the projecting wall 18, and the tip of second fixed electrode 21 abuts against the lower surface of the engaging portion 25A formed at the lower end portion (See FIG. 4). On the back surface 18B of the projecting surface on both sides of the lances 25, as shown in FIG. 6, a lance protecting walls 26, 26 standing upwardly beyond the lances 25 are provided.

In the plug storage section 15 at the position away from the projecting wall 18 farther than the partitioning walls 17, there is formed an end wall 27 standing upright from the base 11, as shown in FIG. 1, and the plug 50 described later is guided by the end wall 27 and fitted to the tip of the projecting wall 18.

Figure 5:
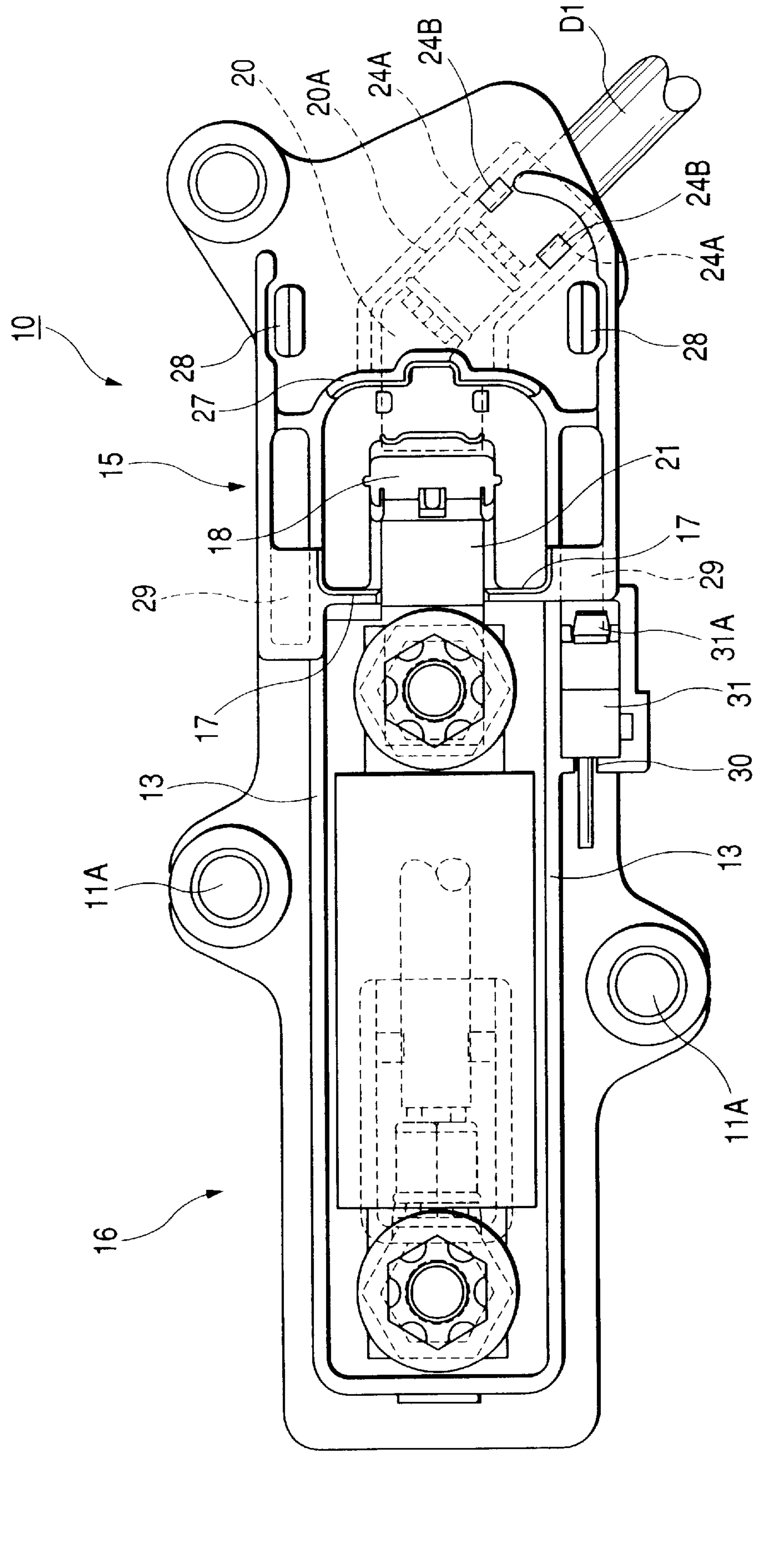
FIG. 5 is a plan view of the breaker body.

In the plug storage section 15 at the position away from the partitioning walls 17 farther than the end wall 27, as shown in FIG. 5, the engaging strips 28, 28 are standing adjacent to both elongated walls 13, 13, with which the ends of the lever 60 provided on the plug 50 are engaged.

The back side of the base 11 corresponding to the plug storage section 15 (the surface facing downward in FIG. 4) is provided with a cable holding portion 24 for holding the cable D1 extending from the first fixed electrode 20. The cable holding portion 24 receives a cable D1 between a pair of opposed walls 24A, 24A suspended from the back surface of the base 11 facing with respect to. each other, and limits the downward movement of the cable D1 by means of a pair of cable engaging projections 24B, 24B projecting from the opposed walls 24A, 24A toward each other. The cable engaging projection 24B is formed with a guiding surface inclining downwardly for providing ease of the cable D1 passage as far as it will go.

The stepped portions of the elongated walls 13, 13 formed at the boundary between the plug storage section 15 and the fuse storage section 16 are provided with a pair of receiving sections 29, 29. These receiving sections 29 are opened toward the direction along the length of the breaker body 10 and closed on the top portions thereof, in which the end portions of the lever 60 provided on the plug 50 are received. One of these receiving sections 29 is in communication with the micro switch storage chamber 30, so that the contact point 31A of the micro switch 31 (See FIG. 1) received therein may be turned ON by the lever 60 inserted in the receiving section 29.

The fuse storage section 16 will now be described. As shown in FIG. 4, the fuse storage section 16 is provided on both shorter ends with a pair of seat portions 16C, 16C protruding from the base 11, in which metallic bolts B1, B2 are insert molded with their heads embedded and the threaded portion extended upward. The second fixed electrode 21 is inserted into the bolt B1 located near the plug storage section 15, and the terminal strip 32 is inserted into the other bolt B2.

The terminal strip 32 is formed by bending a metallic plate into a crank shape and provided with a cable D2 on the barrel portion 32A formed on one end thereof. Then, the bolt B2 is inserted into the bolthole 32B formed on the tip of the terminal strip 32 with the cable D2 inserted into the fuse storage section 16 through the service hole 33 (See FIG. 4) from the back side of the base 11. The cable D2 is pulled outwardly from the service hole 33 and held by the cable holding portion 34 provided on the back side of the base 11.

As shown in FIG. 4, the cable holding portion 34 comprises a pair of opposing walls 34A, 34A suspended from both edge of the service hole 33 on the back surface of the base 11 and connected between the lower edges thereof by a bottom wall 34B, so that most part of the service hole 33 is covered. The cable D2 is prevented from being drooped downwardly by an elongated projection 34C projecting upward from the bottom wall 34B.

The fuse 35 stored in the fuse storage section 16 comprises, as shown in FIG. 1, a metallic projections 35A, 35A projecting from both ends of the cylindrical body and having respectively round holes 35B passing therethrough, through which both bolts B1, B2 of the fuse storage section 16 are inserted and tightened with nuts N, N thereon.

Figure 2:
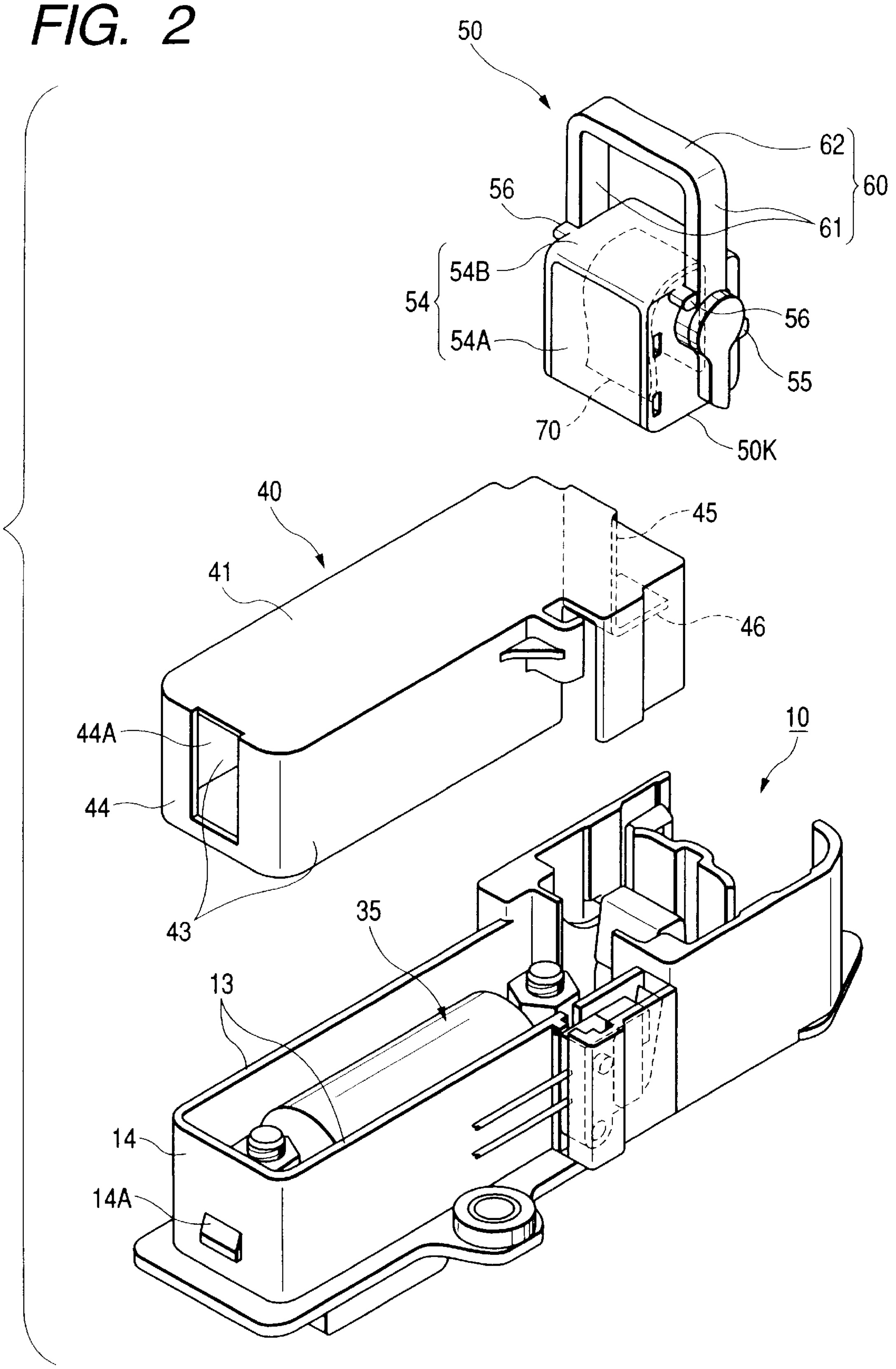
FIG. 2 is a perspective view of the breaker apparatus showing a state in which the cover and the plug are removed.

The fuse storage section 16 is fitted with a cover 40 shown in FIG. 2. The cover 40 comprises an elongated top wall 41 formed corresponding to the fuse storage section 16, a pair of elongated walls 43, 43 extending in parallel along the length thereof, and a short wall 44 connecting the ends of these elongated walls 43, 43 with the other ends left open. On the opened end, the rectangular vertical wall 45 is suspended from the top wall 41 and is formed with a limiting projection 46 overhanging outwardly longitudinally of the cover 40 from the tip thereof.

Next, a plug 50 will be explained. As shown in FIG. 2, the plug 50 has a rectangular cylindrical housing 54 with a bottom, and a recess 51 (See FIG. 7) opens at the lower surface thereof. A U-shaped lever 60 is pivotably provided on an outer surface of the housing 54.

The lever 60 is, as shown in FIG. 2, formed of a pair of arms 61, 61 connected on each end by the operating portion 62, and each arm 61, 61 is provided with a pivot 63, 63 (See FIG. 7) projecting toward the housing 54. The pivots 63, 63 are inserted into the axis hole 63H (See FIG. 7) formed on both side surfaces of the housing 54, so that the lever is pivotable.

Figure 7:
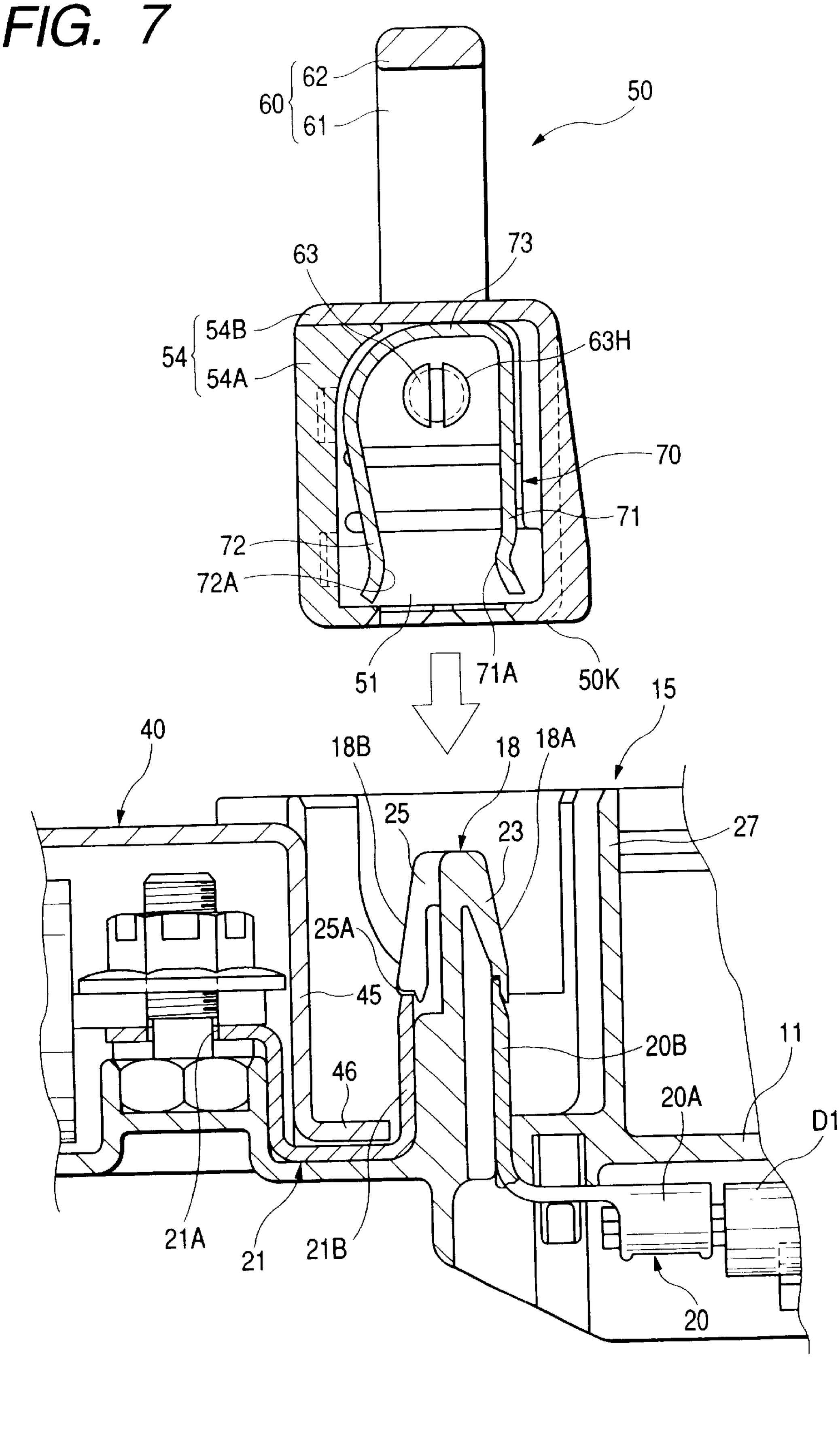
FIG. 7 is a cross sectional side view showing a state prior to fitting the plug on the projecting wall.
Figure 8:
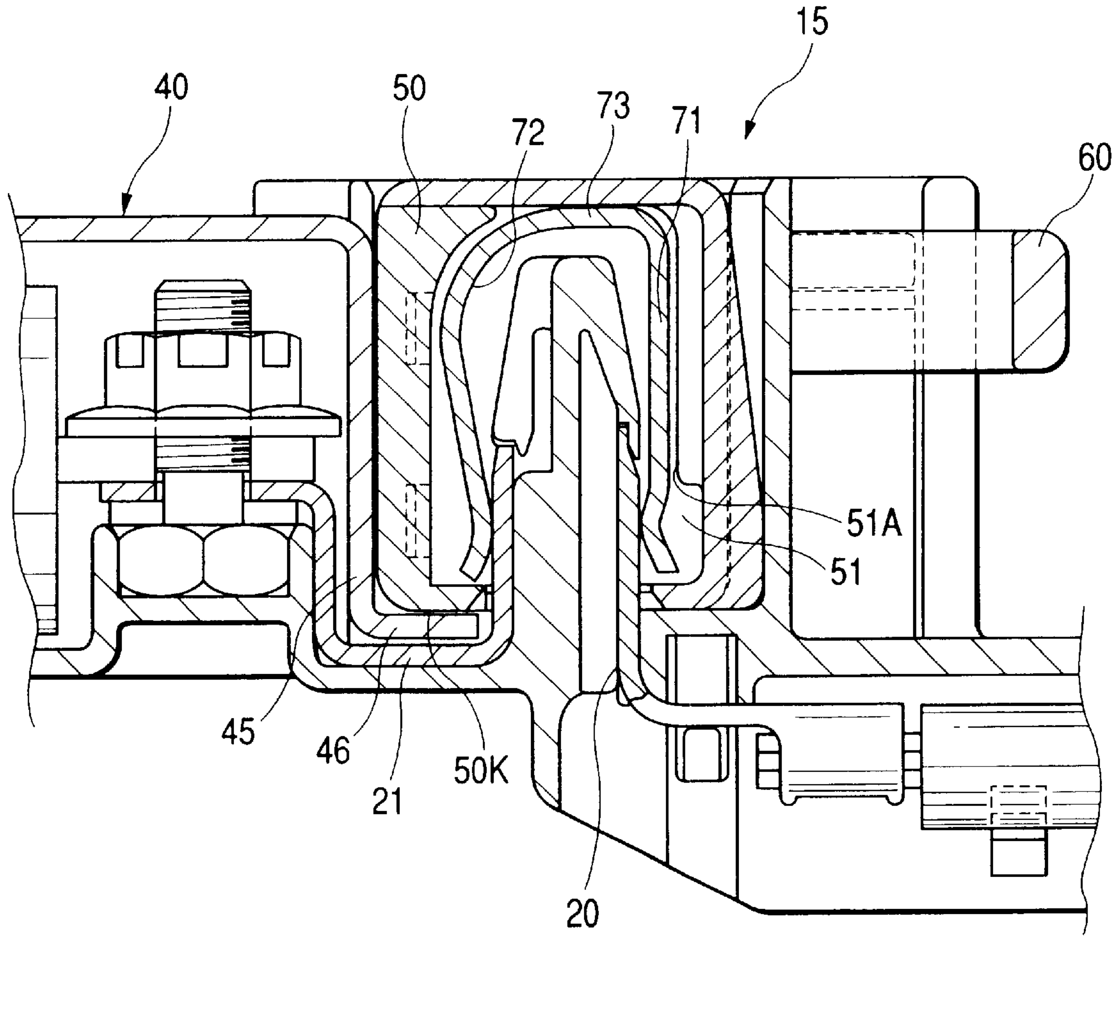
FIG. 8 is a cross sectional side view showing a state in which the plug is fitted on the projecting wall.

On both side surfaces of the housing 54, as shown in FIG. 2, there are provided a rotational movement limiting projections 55, 56 for limiting the pivotable range of the lever 60, whereby the lever 60 is pivotable in the range of 90 degrees between the upright position as shown in FIG. 7 and the horizontal position as shown in FIG. 8.

The housing 54 is, as shown in FIG. 7, provided with a wall portion 54A constituting a part of surrounding wall separately from the remaining main portion 54B, and when the wall portion 54A is not mounted on the main portion 54B, the movable electrode 70 is stored into the recess 51 from the opening and then the opening is closed by the wall portion 54A later.

The recess 51 formed in the housing 54 is enlarged inside in comparison with the opening, so that the movable electrode 70 stored in the recess 51 abuts against the edge of the opening of the recess 51 at its lower end so as not to be disengaged in the natural state.

The movable electrode 70 is, as shown in FIG. 7, formed of a first and a second clamping strips 71, 72 to be brought into contact with the respective fixed electrodes 20, 21 connected by the connecting portion 73. More specifically, the first clamping strip 71 is linearly extending along the inner surface of the recess 51 of the housing 54, and the connecting portion 73 extends at a right angle from the proximal end (upper end in FIG. 7) of the first clamping strip 71, then gently curved as it neared the second clamping strip 72, and then continued to the second clamping strip 72. On the tips of both clamping strips 71, 82, there are provided contact points 71A, 72A projecting therefrom toward each other.

The breaker apparatus of this embodiment has a structure as described above. The operation thereof will now be described. The breaker apparatus is mounted to the electric vehicle in a following manner. As a first step, a part of the power cables of the electric vehicle denoted as D1 and D2 above are attached, then the bolt is passed through the mounting hole 11A (See FIG. 5) formed on the base portion 11, and the breaker body 10 is fixed on a prescribed position of the electric vehicle.

Then, the cover 40 is fitted to the fuse storage section 16 of the breaker body 10. When the elongated wall 43 and the short wall 44 are pressed so as to fit around the elongated wall 13 and the short wall 14 of the breaker body 10, and when it is pressed deeper, the engaging hole 44A formed on the short wall 44 of the cover 40 :and the engaging projection 14A formed on the short wall 14 of the breaker body 10 are engaged with respect to each other (See FIG. 3). At this time, the vertical wall 45 formed on the cover 40 is inserted between a pair of partitioning walls 17, 17 formed on one end of the fuse storage section 16, and the limiting projection 46 is laid in the vicinity of the proximal portion of the projecting wall 18 of the base 11 of the breaker body 10 (See FIG. 7).

Figure 3:
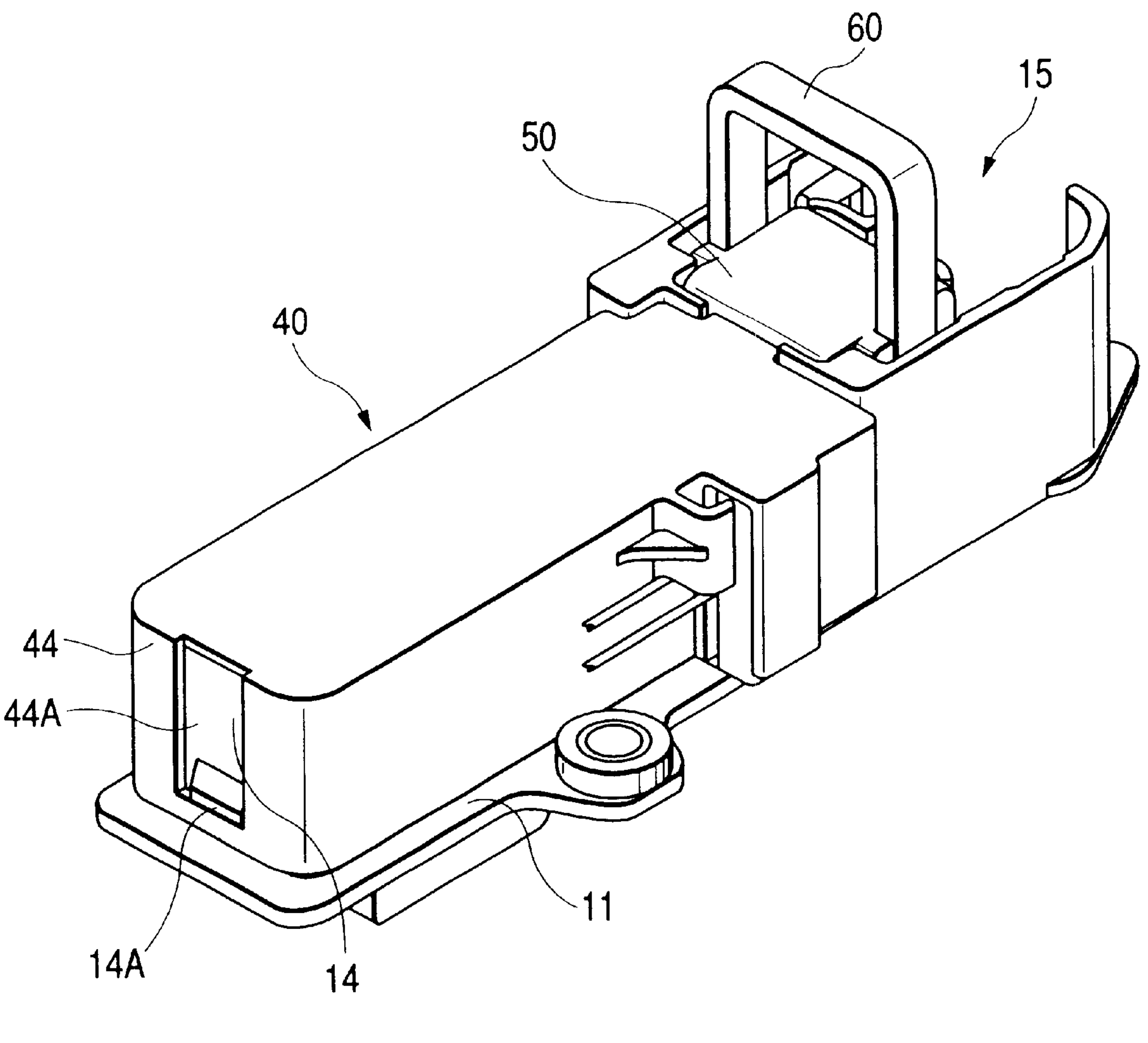
FIG. 3 is a perspective view showing a state in which the plug is inserted into the plug storage section.

In this state, the plug 50 is inserted deep in the plug storage section 15 provided on the breaker body 10 as shown in FIG. 3. In this case, only a single plug 50 is required to be mounted, mounting operation can be carried out easier than the case of conventional one that requires two plugs.

Figure 9:
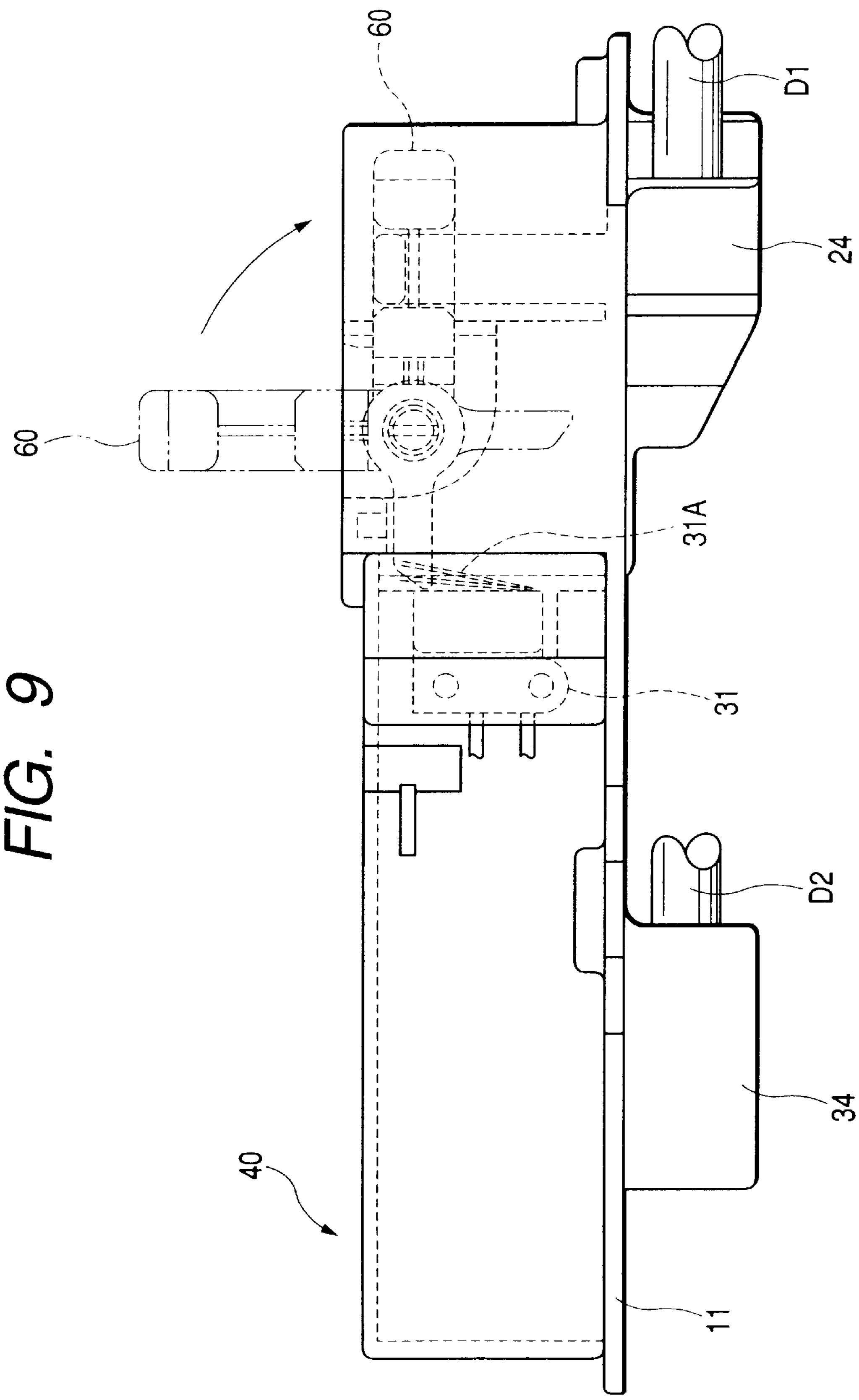
FIG. 9 is a cross sectional view of the breaker apparatus.

When the plug has inserted deeply inside, the lever 60 is pivoted from the upright position to the horizontal position, as shown in FIG. 9. Then, the pivoting end of the arm 61 constituting the lever 60 opposite from the operating portion 62 is inserted into the receiving portion 29 provided on the breaker body 10, and the operating portion 62 of the arm 61 is engaged with the engaging strip 28 provided on the breaker body 10. When the plug 50 is mounted, the limiting projection 46 provided on the cover 40 is engaged with the lower surface 50K of the plug 50 (See FIG. 8). Therefore, the cover 40 is engaged at both ends in locked state by this engagement with the plug 50 (engagement between the lower surface 50K and the limiting projection 46) and the engagement described above with the breaker body 10 and (engagement between the engaging projection 14A and the engaging hole 44A), whereby the cover 40 is prevented from being disengaged due to inclination thereof.

When the lever 60 is pivoted, the end of the lever 60 goes into one of receiving portions 29 and turns the micro switch 31 ON (See FIG. 9), so that a signal indicating that the plug 50 is mounted is transmitted to a prescribed circuit.

When the plug 50 is mounted into the plug storage section 15 in the plug 50, the projecting wall 18 is interposed between the first clamping strip 71 and the second clamping strip 72 of the movable electrode 70, and each clamping strip 71, 72 is brought into contact with each fixed electrode 20, 21 laid on the projecting wall 18, whereby both fixed electrodes 20, 21 are brought in conduction so that the fuse 35 is fed with a current.

When replacing the fuse 35, the following steps are taken. As a first step, the plug 50 is pulled out from the plug storage section. Then the cover 40 is removed from the breaker body 10. Since the upper surface of the fuse storage section 16 is opened, the nut N fixing the fuse 35 is removed and replaced with a new fuse 35. At this time, since the plug is removed and the fuse is not fed with a current, replacement of the fuse can be curried out safely.

What happens in the case where the operator tried to replace the fuse 35 with the plug 50 mounted by following the wrong procedure is as follows. When the operator tried to remove the cover 40 with the plug 50 mounted, the limiting projection 46 provided on the cover 40 abuts against the lower surface 50K of the plug 50 so that the cover 40 cannot be moved to the direction that the cover 40 can be removed. At this point in time, the operator recognizes that the plug 50 has to be pulled out first in order to replace the fuse 35, and thus follows the correct procedure to replace the fuse 35. Since the limiting projection of this embodiment 46 is engaged with the lower surface 50K of the plug 50 at the distal end when viewed in the fitting direction, even in the state where the plug is removed partway, it is still engaged with the lower surface 50K of the plug 50 so that the cover 40 cannot be separated from the fuse storage section 16. In other words, unless the plug 50 is completely removed and the fuse 35 is completely brought out of conduction, the cover 40 cannot be disengaged from the breaker body 10, thereby preventing replacement of the fuse in the conducting state.

The breaker apparatus of this embodiment, since a pair of fixed electrodes 20, 21 are located at one point by laying them on the front and back surfaces of the projecting wall 18, the space around both fixed electrode 20, 21 are shared and thus the breaker apparatus can be downsized. When the plug 50 is fitted on the projecting wall 18, the limiting projection 46 provided on the cover 40 covering the fuse storage section 16 is engaged with the lower surface 50K of the plug 50, whereby the cover 40 cannot be removed unless the plug 50 is pulled out, and thus when replacing the fuse, the plug 50 is disengaged and brought out of conduction. Therefore, the replacement of the fuse can be carried out safely and smoothly.

Second Embodiment

Figure 10:
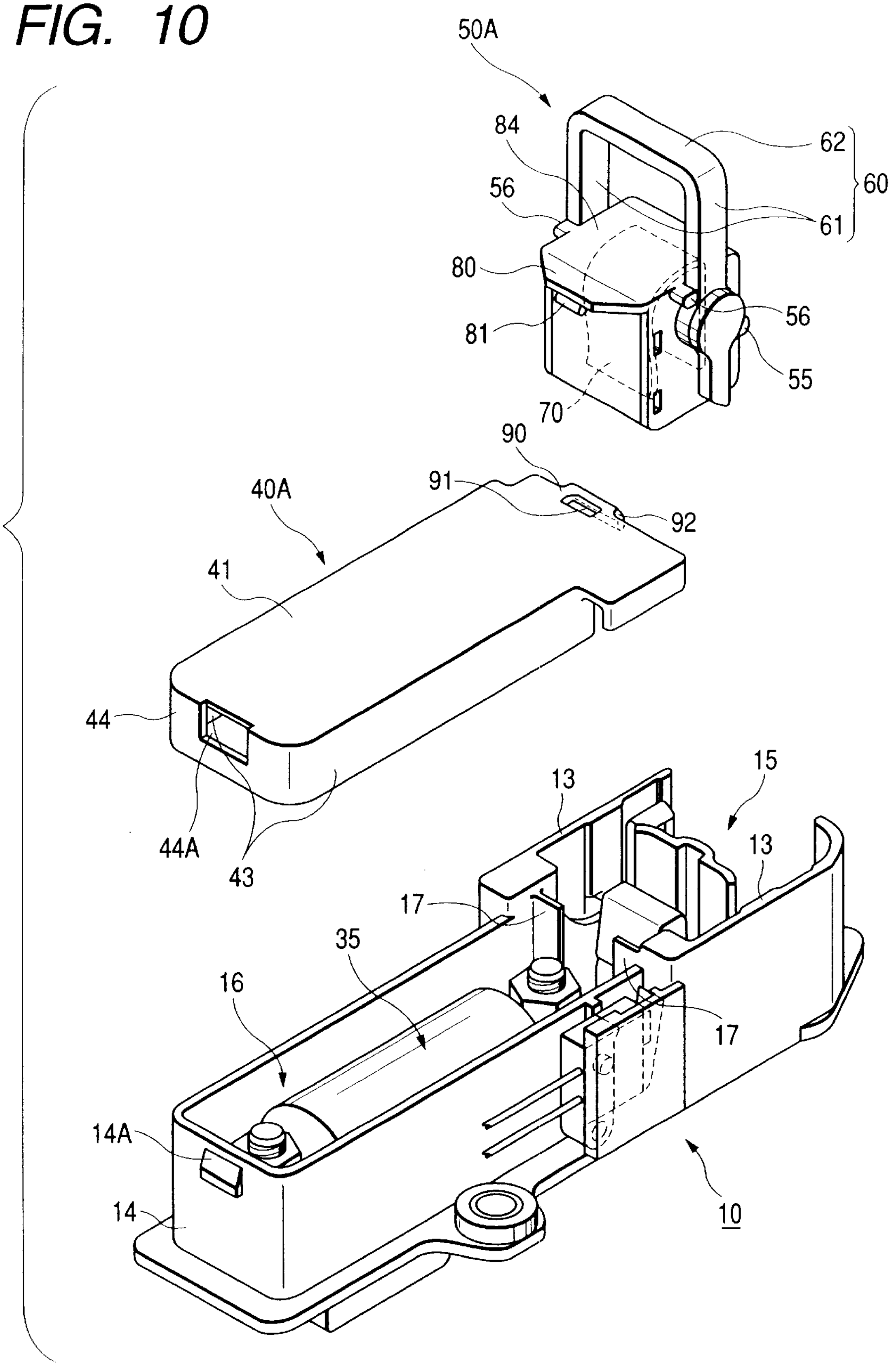
FIG. 10 is a perspective view showing a state in which the cover and plug of the breaker apparatus are removed according to the second embodiment.
Figure 11:
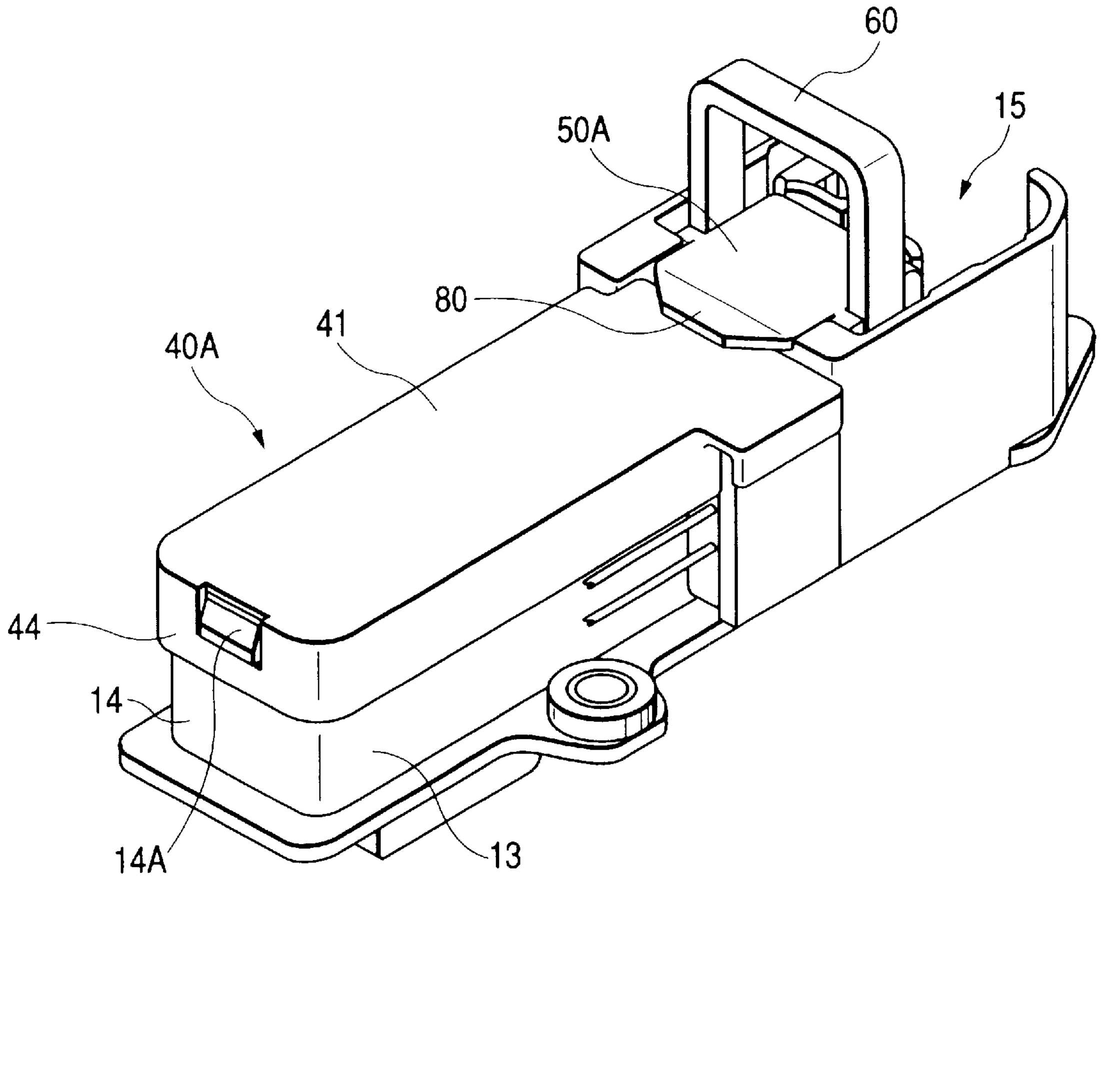
FIG. 11 is a perspective view showing a state in which the plug is inserted into the plug storage section.
Figure 12:
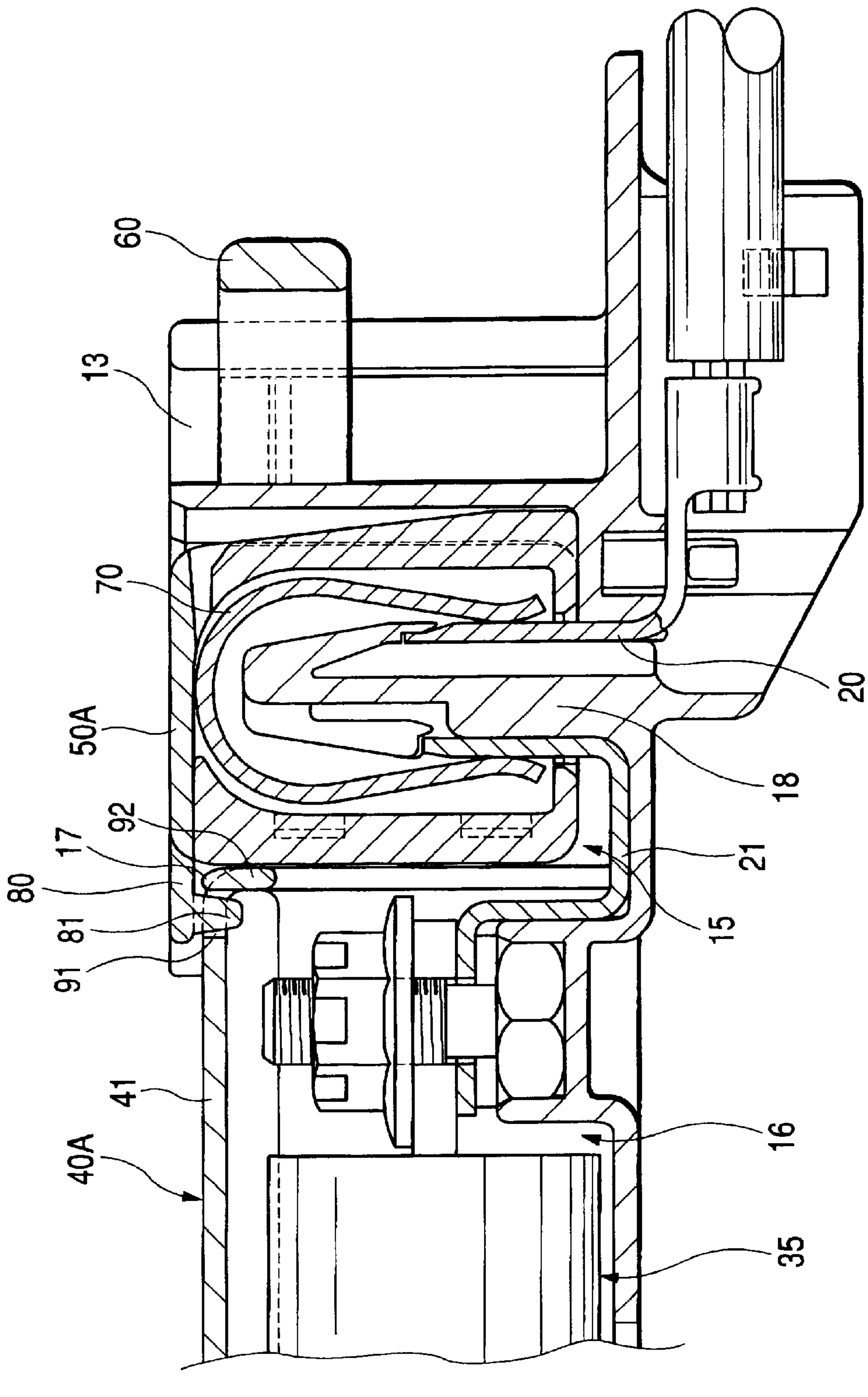
FIG. 12 is a cross sectional side view showing a state in which the plug is fitted on the projecting wall.
Figure 13:
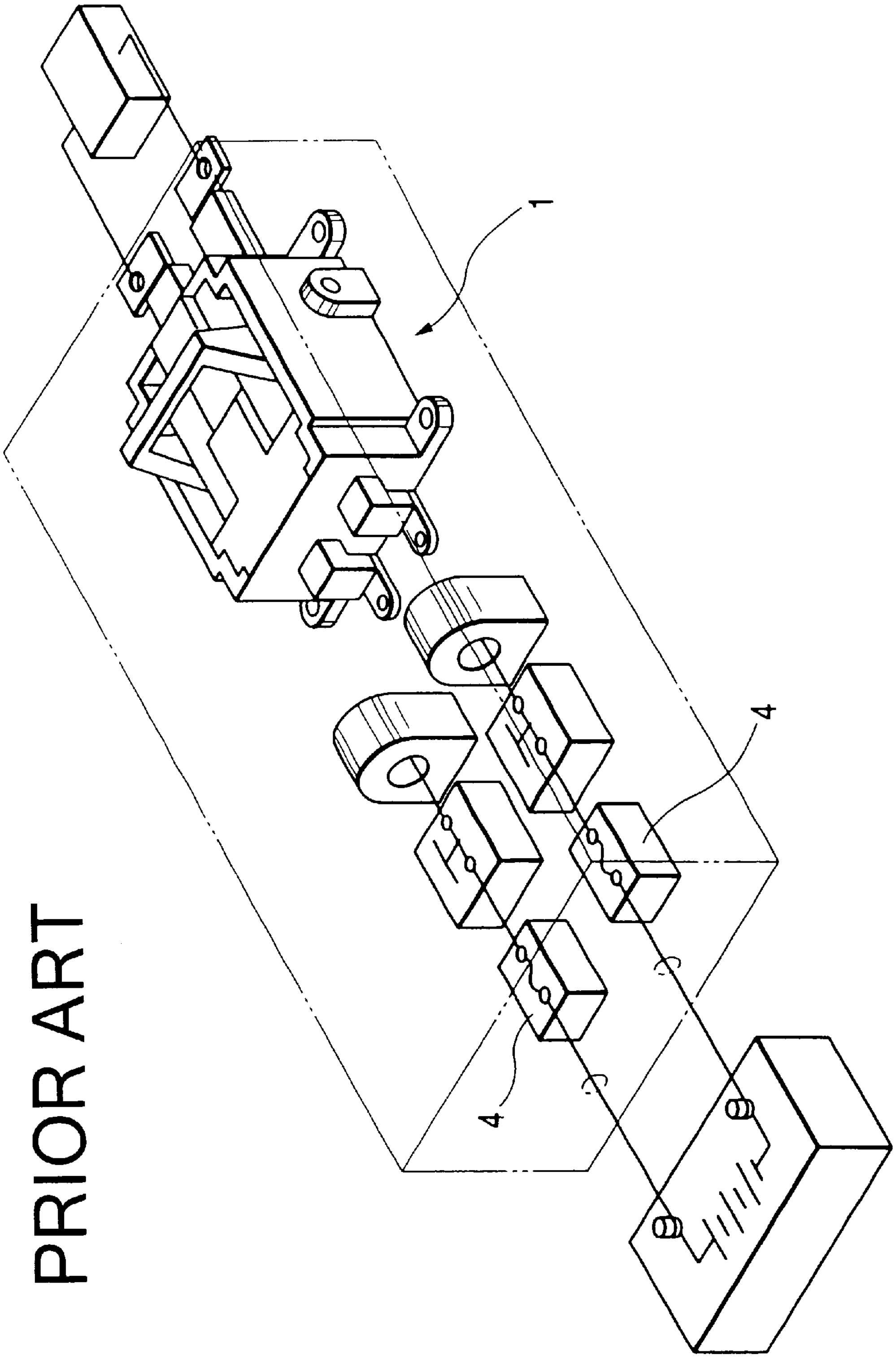
FIG. 13 PRIOR ART
FIG. 13 is a perspective view of the conventional breaker.
Figure 14:
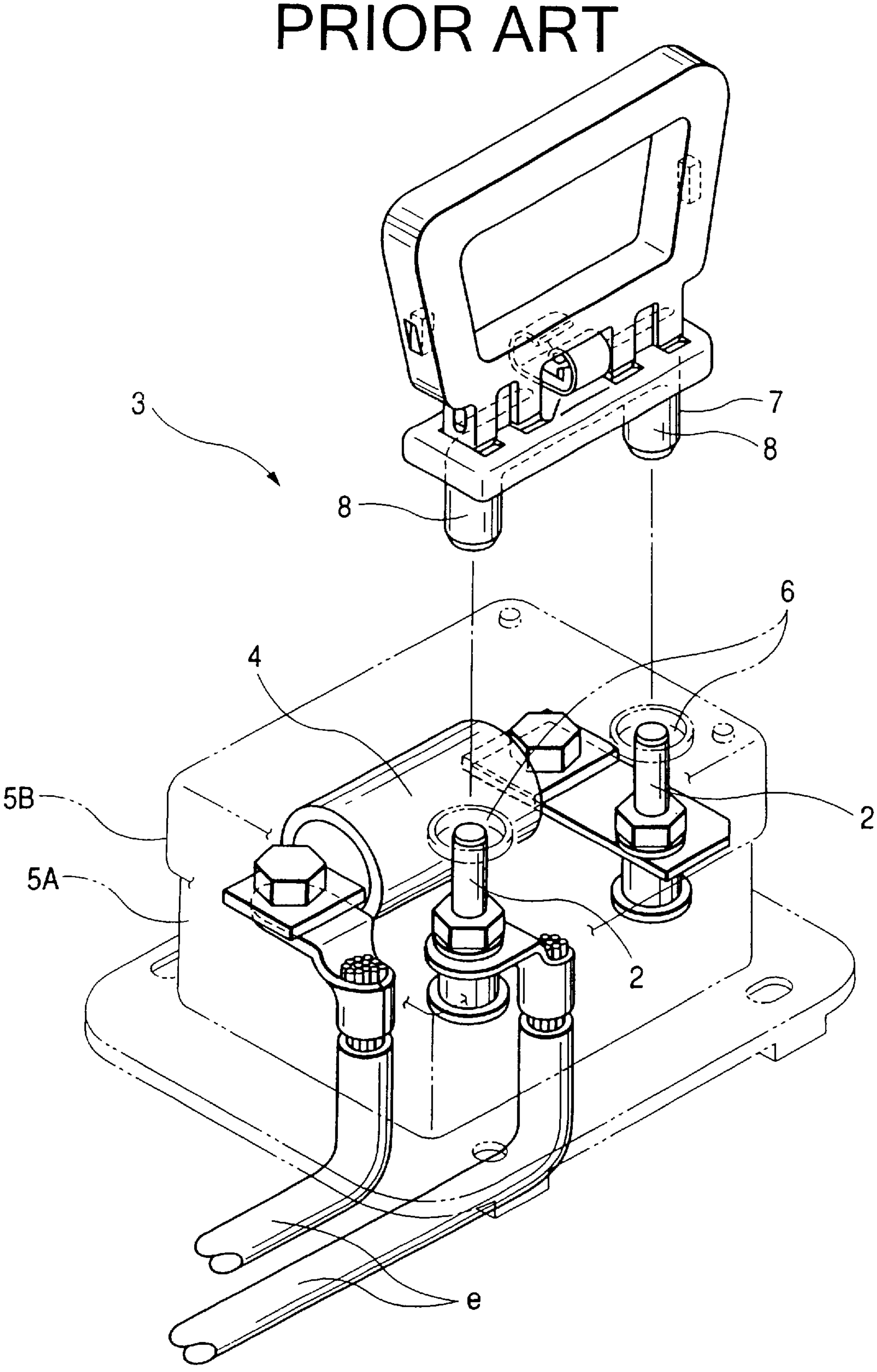
FIG. 14 PRIOR ART
FIG. 14 is a perspective view of another conventional breaker.

Referring now to FIG. 10 to FIG. 12, the second embodiment of the present invention will be described.

The second embodiment is an alternative of the structure that engages the cover 40A mounted on the storage section 16.

In the following paragraph, differences from the first embodiment will be mainly described, and identical numbers are designated to the parts having the identical functions as the first embodiment to avoid overlapped description.

The plug 50A is formed with a holding strip 80 constituting an engaging surface of the present invention. The holding strip 80 is, as shown in FIG. 10, extending flush with the edge of the top wall of the housing 84 on the side of the cover 40A, and being trapezoidal in shape tapering toward the tip. On the lower surface of the holding strip 80 along the edge, there is formed an elongated projection 81 in the direction of width projecting downward and tapering toward the tip thereof.

On the cover 40A, the edge of the top wall 41 on the opening side (the end adjacent to the plug 50A) serves as a limiting portion 90 to be engaged by the holding strip 80 described above (corresponds to the "cover motion stopper" of the present invention). The stopper 90 is formed with an elongated square hole 91 to which the projection 81 described above will be inserted. On the outer edge of the hole 91 on the stopper 90, there is formed a short fitting wall 92 bent downwardly at a right angle, which can be fitted between both partitioning walls 17.

In the breaker body 10 of this embodiment, the partitioning wall 17 is slightly lower in height for accommodating the holding strip 80 overhanging from the plug 50A.

The elongated walls 43 and the short wall 44 according to the present invention are lower in height than the first embodiment. In conjunction with this, the engaging projection 14A formed on the short wall 14 of the breaker body 10 is formed at the upper position than that of the first embodiment corresponding to the position of the lower edge of the engaging hole 44A (See FIG. 10).

The operation of the second embodiment will now be described.

The cover 40A is mounted on the breaker body 10 having a fuse 35 mounted thereon. At this time, the fitting wall 92 of the cover 40A inserted between the partitioning walls 17, 17 limits rattling of the cover 40A.

When the plug 50A is pressed into the plug storage section 15, as shown in FIG. 11, the holding strip 80 overhanging toward the fuse storage section 16 beyond the partitioning wall 17 holds the stopper 90 on the cover 40A. Simultaneously, as shown in FIG. 12, the projection 81 of the holding strip 80 is inserted into the hole 91 on the stopper 90. At this time, since the projection 81 is tapered, it can be inserted into the hole 91 smoothly.

In this way, since the holding strip 80 of the plug 50A holds and engages with the cover 40A, as in the case of the first embodiment, the cover 40A cannot be removed unless the plug 50A is pulled out, whereby replacement of the fuse can be carried out safely and smoothly.

Especially in the second embodiment, since the portion holding the cover 40A has a structure being exposed to the outside, it is very convenient to check the state of engagement visually.

Since the projection 81 of the holding strip 80 is fitted into the hole 91 on the stopper 90, it reliably prevents the cover 40A from being disengaged.

In the second embodiment, since the elongated wall 43 and the short wall 44 forming the side surfaces of the cover 40A are short in height, the amount of material used may be economically reduced and the surrounding walls resist warping.

Other Embodiment

It is to be understood that the present invention is not limited to embodiment shown here, and other embodiments shown below are also included in the technical scope of the present invention, and that various changes may be resorted to without departing from the principle of the present invention.

(1) While the cover motion stopper (limiting projection 46) of the first embodiment is formed in the shape of a projecting strip and engages with the lower surface 50K of the plug 50, the cover motion stopper may be formed of a lock arm extending along the side surface of the plug in which when the plug is stored in the plug storage section, the lock arm is warped so that the locking projection formed on the tip thereof engages with the engaging hole formed on the side surface of the plug.

(2) While the second embodiment described above has a structure in which the projection 81 of the holding strip 80 is engaged with the hole 91 on the stopper 90, the projection 81 and the hole 91 may be omitted.

(3) On the other hand, in the first embodiment, a projection may be formed on one of the lower surface 50K of the plug 50 or the limiting projection 46 for engagement with a hole formed on the other one of those.

What is claimed is:

1. A breaker apparatus comprising:

a projecting wall standing upright from a base of a breaker body;

a pair of plate-shaped fixed electrodes laid on front and back surfaces of said projecting wall;

a recessed plug to be fitted on said projecting wall;

a U-shaped movable electrode to be stored in said plug for bringing said fixed electrodes into conduction by clamping said projecting wall on the front and back surfaces thereof;

a fuse storage section for storing a fuse connected to one of said fixed electrodes the fuse storage section including a surrounding wall standing upright from said base in parallel with said projecting wall;

a cover for covering an opening of said fuse storage section and being fittable to said surrounding wall;

an engaging surface formed on said plug and facing in a fitting direction of said plug; and a cover motion stopper provided on said cover for engaging with said engaging surface of said plug with said plug fitted to said projecting wall.

2. The breaker apparatus according to claim 1, wherein said engaging surface is disposed on a tip side said plug in the fitting direction; and said cover motion stopper is disposed on a lower end of a vertical wall suspending from a top portion of said cover along a side surface of said plug and formed in a shape of a projecting strip overhanging from the lower end of said vertical wall sodas to lie along said engaging surface of said plug.

3. The breaker apparatus according to claim 1, wherein said engaging surface is overhanging from a top surface of said plug toward said, cover so as to engage with said cover motion stopper said cover motion stopper being formed on an upper surface of said cover.

4. The breaker apparatus according to claim 1, wherein a projection is formed on either one of said engaging surface or said cover motion stopper for engaging with a hole formed on the other one thereof.

5. The breaker apparatus according to claim 1, wherein an engaging portion is formed on said cover for engaging with said surrounding wall of said breaker body to prevent said cover from being disengaged.

* * * * *